United States Patent [19]

McBroom et al.

[11] 4,428,834
[45] Jan. 31, 1984

[54] FLUID FILTER WITH INTEGRAL VISCOUS DAMPER

[75] Inventors: Kendall R. McBroom, Dakota County; Dhanendra C. Shah, Ramsey County, both of Minn.

[73] Assignee: Donaldson Company, Inc., Minneapolis, Minn.

[21] Appl. No.: 312,383

[22] Filed: Oct. 19, 1981

[51] Int. Cl.³ .................... B01D 27/10; B01D 35/14
[52] U.S. Cl. ................................ 210/131; 210/349; 210/541
[58] Field of Search ............. 210/133, 349, 435, 168, 210/131, 132, 541

[56] References Cited

U.S. PATENT DOCUMENTS

| 3,314,541 | 4/1967 | Rosaen | 210/132 |
|---|---|---|---|
| 3,814,251 | 6/1974 | Aspinwall et al. | 210/133 |
| 3,819,052 | 6/1974 | Firth | 210/90 |
| 3,827,558 | 8/1974 | Firth | 210/90 |
| 3,847,819 | 11/1974 | Firth | 210/444 |
| 4,051,031 | 9/1977 | Suzuki | 210/133 |
| 4,316,801 | 2/1982 | Cooper | 210/133 |

Primary Examiner—Benoit Castel
Assistant Examiner—John W. Czaja
Attorney, Agent, or Firm—Merchant, Gould, Smith, Edell, Welter & Schmidt

[57] ABSTRACT

The specification discloses an improved fluid filter (10) including a housing (12), cover (26), spring biased filter element (30) movable between normal and bypass positions, and viscous damper (50) for eliminating oscillation of the filter element. The damper (50) can comprise either a circumferential integral step (52) formed in the filter housing (12) or a separate sleeve (54) inserted therein, located a predetermined distance below the lower end of the filter element (30) when the filter element is in the normal position.

22 Claims, 4 Drawing Figures

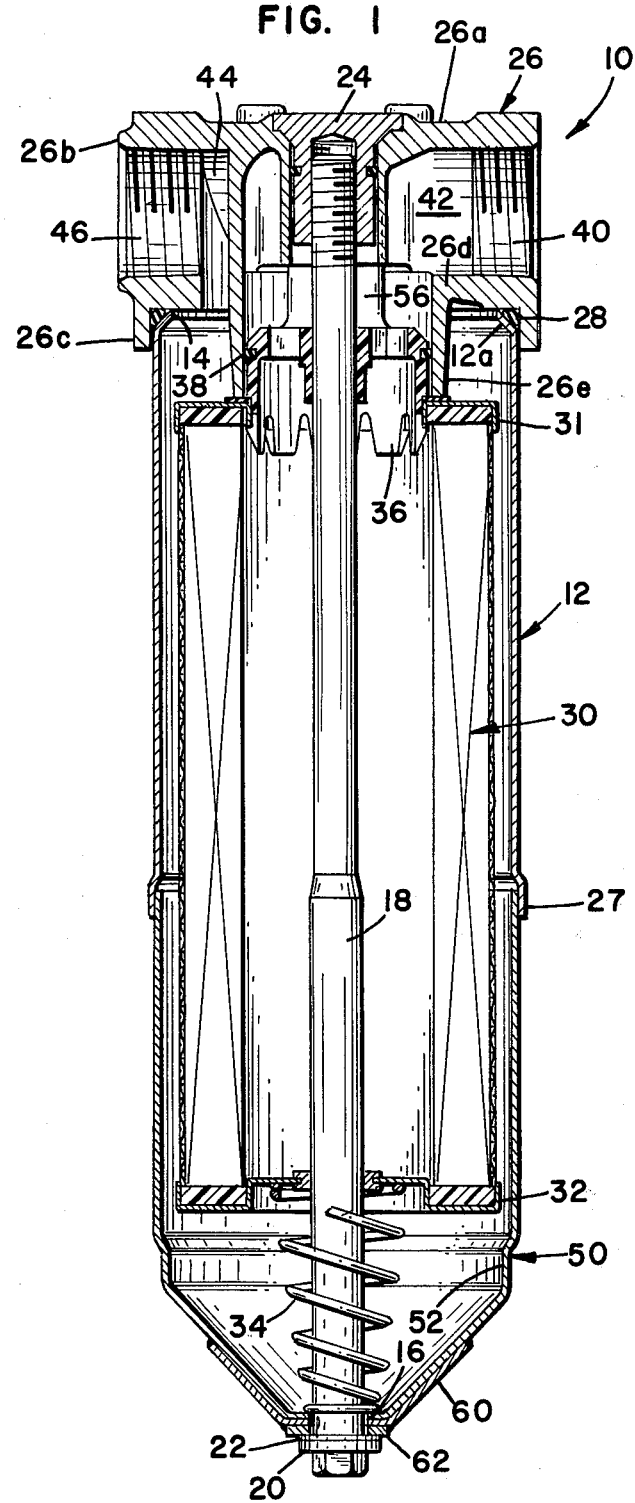

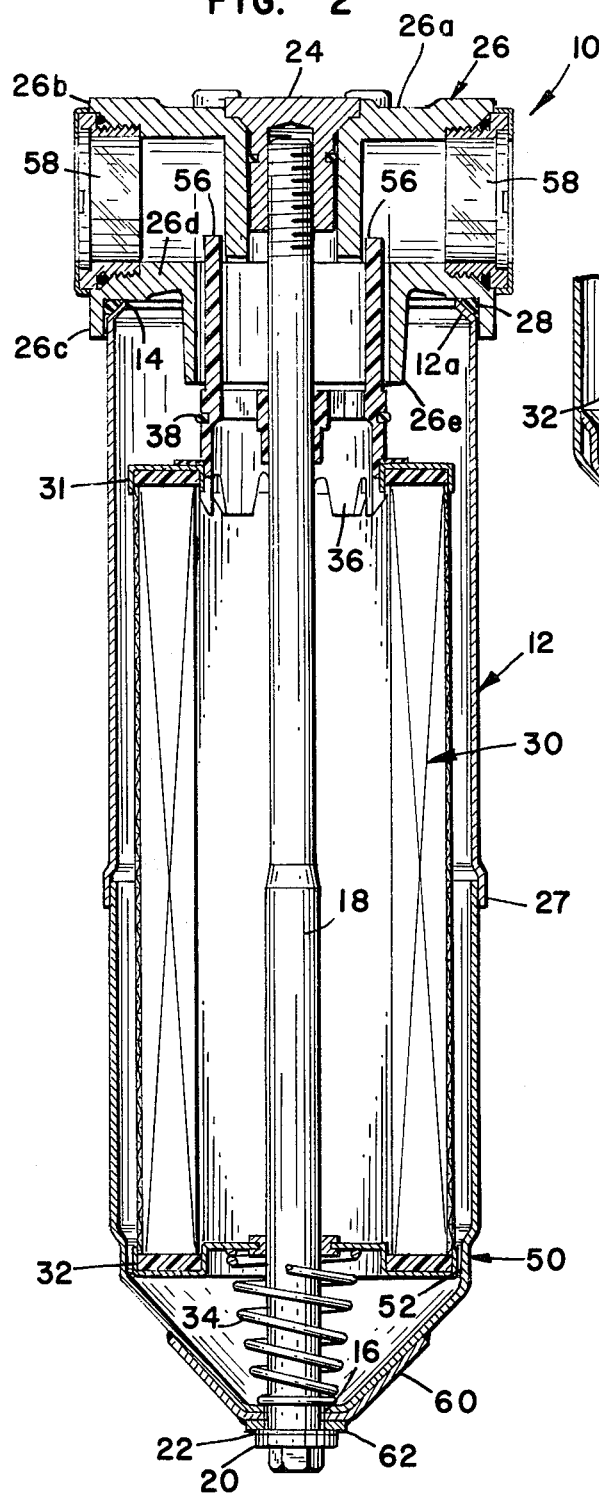
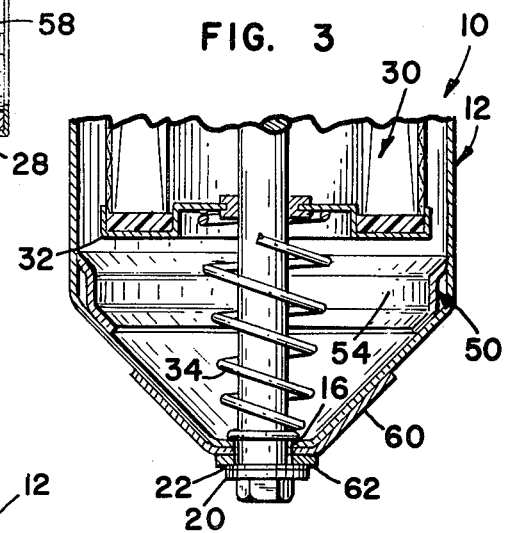

FLUID FILTER WITH INTEGRAL VISCOUS DAMPER

TECHNICAL FIELD

The present invention relates generally to fluid filters with movable filter elements, and more particularly relates to an improved fluid filter incorporating an integral viscous damper to eliminate oscillation of the filter element between the normal and bypass positions.

BACKGROUND ART

Various filters have been develped for filtering fluid, such as oil in hydraulic systems for example, and the desirability of providing bypass structure to permit the fluid to pass around the filter element when it becomes clogged is generally recognized. A popular approach has been to provide a bypass valve and movable filter element within a housing closed at one end by a cover. The filter element is normally spring-biased toward a position wherein the bypass valve is closed and filtration of the fluid can occur, but the filter element can move to an offset position wherein the bypass valve is open if the filter element becomes clogged and the pressure differential thereacross becomes too high so that fluid can flow around it and continue to circulate through the system without damage thereto. Various indicators have also been developed to signal such bypass conditions so that the filter elements can be changed, with U.S. Pat. Nos. 3,819,052 and 3,827,558 assigned to Donaldson Company, Inc. being representative of fluid filters having this feature.

The movable filter elements of such fluid filters, however, may under certain conditions experience oscillation which, if uncontrolled, may lead to problems. The possibility of filter element oscillation, which has been reported from the field and verified in the lab, increases as the filter element becomes progressively clogged, and is directly related to the sudden change in cross sectional flow area as it moves between the normal and bypass positions. As the filter element begins to move toward the bypass position in opposition to the retaining spring, the flow areea increases which results in decreased pressure drop across the filter element. This reduction in pressure enables the spring to force the filter element back toward the normal position, thereby decreasing the flow area and increasing the pressure drop, which in turn results in oscillation. Such oscillation may accelerate structural failure of the filter element and cause fluctuations in the electrical or visual indications of the filter conditions. Sudden displacements of the filter element by high pressure spikes such as during cold starts or other flow surges can also lead to such problems.

Fluid filters utilizing auxiliary mechanical means disposed between the filter element and the housing have been used heretofore for cushioning shock of the filter element during movement to the full bypass position; however, a need exists for an improved fluid filter incorporating an integral viscous damper to minimize and eliminate oscillation of the filter element.

SUMMARY OF THE INVENTION

The present invention comprises an improved fluid filter which overcomes the foregoing and other difficulties associated with the prior art. In accordance with the invention, there is provided a fluid filter including an integral viscous damper for damping oscillation of the filter element between its normal and bypass positions. In the preferred embodiment, the viscous damper comprises an internal reduced diameter portion formed in the lower end of the filter housing so as to achieve a dashpot effect in conjunction with the filter element and fluid in the housing. The integral viscous damper of the invention is effective, requires no additional parts or the tooling costs associated therewith, and can readily be adapted to fluid filters of either the inside/out or outside/in flow type.

BRIEF DESCRIPTION OF DRAWING

A better understanding of the invention can be had by reference to the following Detailed Description in conjunction with the accompanying Drawing, wherein:

FIG. 1 is an axial sectional view of a fluid filter with an integral viscous damper incorporating a first embodiment of the present invention, showing the filter element in the normal position;

FIG. 2 is an axial sectional view similar to FIG. 1, but rotated 90 degrees, showing the filter element in the bypass position and the indicator tabs/windows;

FIG. 3 is a partial sectional view of a fluid filter with an integral viscous damper incorporating a second embodiment of the invention.

DETAILED DESCRIPTION

Figure 4:
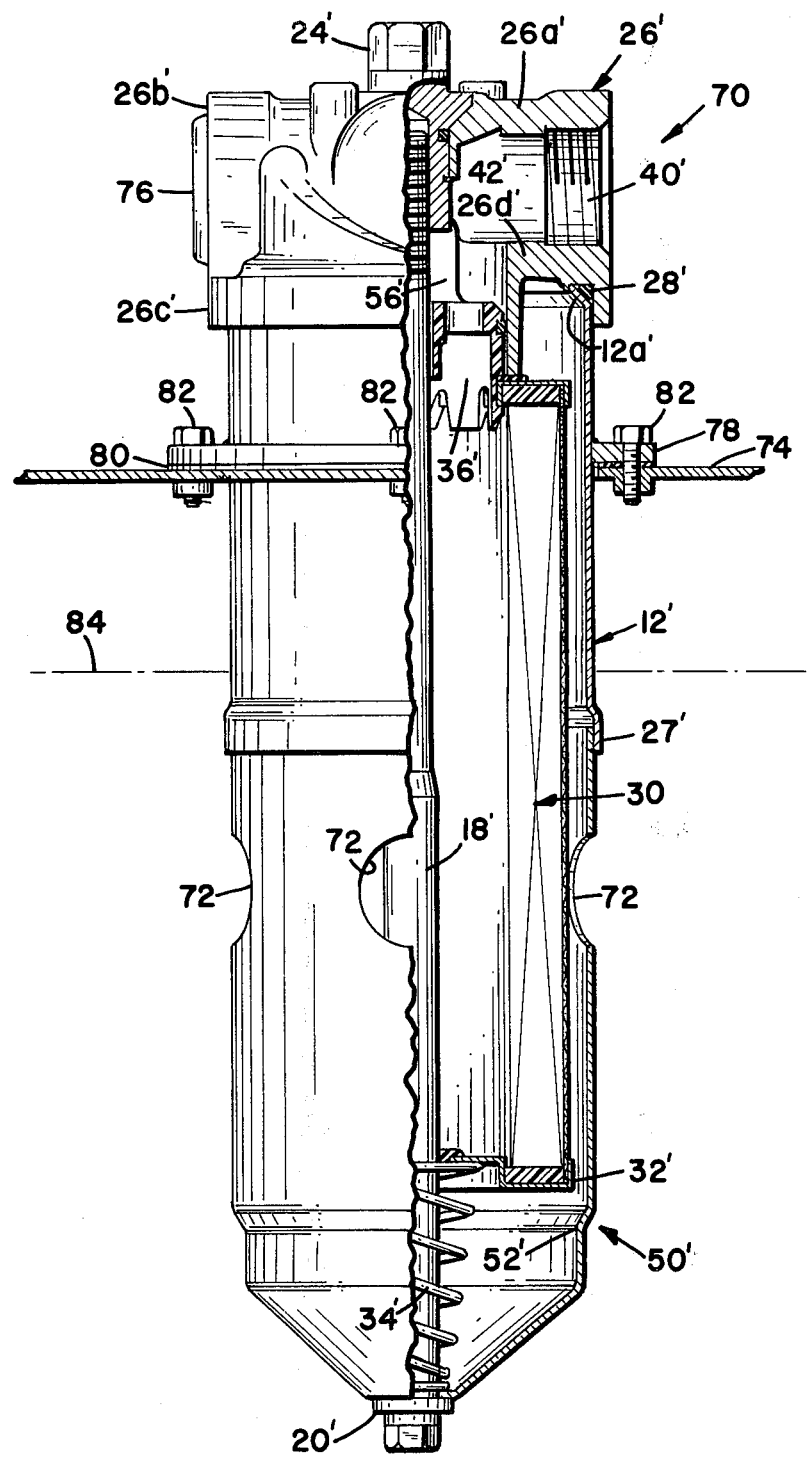
FIG. 4 is a quarter sectional view, partially cutaway, showing another fluid filter incorporating the invention.

Referring now to the Drawing, wherein like reference numerals designate corresponding elements throughout the views, and particularly referring to FIG. 1, there is shown a fluid filter 10 incorporating the invention. Filter 10 is particularly adapted for filtration of oil, as for example in a hydraulic system, and is somewhat similar in general overall construction to the filters shown in U.S. Pat. Nos. 3,827,558 and 3,847,819 which are hereby incorporated by reference. As will be explained in greater detail hereinbelow, however, the fluid filter 10 differs from the filters of the prior art in that it incorporates an integral viscous damper to minimize and eliminate oscillation of the filter element.

Filter 10 comprises a generally cylindrical filter housing 12 having an open top end which terminates in a circular edge 14 lying in a generally horizontal plane. The bottom end of housing 12 is closed except for an axial opening 16 through which extends a central retaining rod 18. A washer 20 and gasket 22 are provided between the outside bottom end of housing 12 and the head of rod 18, which extends axially through the housing and terminates in a threaded end which is screwed to a nut member or plug 24 seated on cover 26. The housing 12 and cover 26 of fluid filter 10 are thus releasably secured together in a clamping fashion with rod 18; however, the housing and cover could be threaded and screwed together or otherwise suitably secured and it will be understood that the particular manner of interconnection is not critical to practice of the invention.

The filter housing 12 is shown for purposes of illustration as being of two-piece construction with the upper and lower pieces connected along a circumferential seam 27, however, the housing can be a single-piece construction or any other suitable construction so long as it incorporates the intergral viscous damper structure which will be described in detail below.

The dome-like cover 26 includes a generally flat top wall 26a and a surrounding circumferential side wall 26b extending downwardly therefrom. A peripheral flange 26c on the bottom end of side wall 26b of cover 26 surrounds and fits snugly over the top end of filter housing 12. The underside of cover 26 further includes a generally flat web portion 26d interconnecting the flange 26c and a tubular guide portion 26e which is coaxially positioned with respect to cover 26. Flange 26c overlaps the outside upper end of filter housing 12, while the guide portion 26e extends inwardly into the open end of the housing.

A circular O-ring 28 is provided between the inside of cover flange 26c and the outside of the inwardly sloping upper end portion 12a of housing 12 to provide a seal. This seal is substantially similar to the arrangement shown in U.S. Pat. No. 3,847,819 assigned to the assignee hereof and offers many of the same advantages thereof.

A cylindrical filter element 30 is located in the filter chamber defined by housing 12 and is guided therein for movement between normal and bypass positions. The filter element 30 surrounds the axial rod 18 and is supported between a pair of disk-like end caps 31 and 32. The bottom end of cap 32 includes an axial opening therein, through which rod 18 extends, and functions to close the lower end of the filter element 30. The filter element 30 is biased upwardly by a compression spring 34, which is located between the end cap 32 and the inside bottom end of filter housing 12, such that the end cap 31 at the upper end of the filter element normally abuts the lower end of the cover guide portion 26e. While element 30 has been shown as guided by axial rod 18, it will be understood that the element could be guided in other manners, such as by longitudinal ribs formed on the inside surface of housing 12.

A tubular bypass member 36, which is slidable along rod 18, is mounted in the central opening of the upper end cap 31 of the filter element 30 and is adapted as its upper end for receipt within the conver guide portion. 26e. A circular O-ring 38 is located between the outside surface of the bypass member 36 and the inside surface of the cover guide portion 26e to provide a seal. Bypass member 36 moves in unison with filter element 30. The filter element 30 is thus supported within filter housing 12 for movement between a normal position engaged with cover 26, in which position bypass member 36 is closed and to which position the element is yieldably spring biased, and a bypass position offset from the cover.

Fluid flow through filter 10 enters and exits via cover 26. Fluid to be filtered enters an inlet 40, which is preferably threaded to facilitate connection with appropriate tubing, and flows from the inlet through an L-shaped passageway 42 and on through bypass member 36 into the interior of filter element 30. The fluid passes outwardly through the filter element 30 into the annulus between the filter element and housing 12 and on into an annular opening 44 and out an outlet 46, which is also preferably threaded for connection purposes. The flow through the element 30 of filter 10 can thus be characterized as inside/out flow whereby any dirt or foreign material fitered out of the fluid is collected within the filter element. Under normal conditions, the filter element 30 is thus positioned as shown in FIG. 1.

If the filter element 30 becomes clogged and/or if there should be a sudden flow surge in the system containing filter 10, the pressure differential across the filter element can become sufficient to force the element downwardly against spring 34 to an offset or bypass position as shown in FIG. 2. Under bypass conditions, bypass member 36 is open and filter element 30 is outside the flow path such that fluid entering inlet 40 and passageway 42 flows through and around the cover guide portion 26e into the annular opening 44 and directly out via outlet 46. As filter element 30 moves from the normal position toward the bypass position, however, there is a sudden change in cross sectional flow area as bypass member 36 passes the lower end of the cover guide portion 26e. This transition suddenly reduces the pressure differential across filter element 30, which in turn enables spring 34 to urge the filter element back toward the normal position whereupon the reverse occurs and oscillation results. As discussed in the Background Art portion herein, such oscillation may lead to shorter service life of the filter element, and/or incorrect indications of the normal/bypass condition of the filter.

To overcome this problem and the difficulties associated therewith, filter 10 incorporates an integral viscous damper 50 formed directly on the filter housing 12. In its simplest form, damper 50 comprises an inward, circumferential ledge or step 52 integrally formed into the lower end of housing 12 subjacent to the lower end of the filter element 30 which is dimensioned to reduce the annular flow space between the bottom end of the filter element and the surrounding housing, thereby achieving a dashpot effect to damp oscillation of the filter element, closure member 32, spring, and bypass member 36. It will be appreciated that during operation of filter 10, fluid fills the entire housing 12 including the bottom portion thereof. Reduction of the annular spacing between the lower end of the filter element 30 and housing 12 by means of a predetermined step 52 results in a viscous damping effect. The upper end of step 52 is preferably positioned to correspond with the point at which bypass member 36 passes the end of the cover guide portion 26e so that damping occurs over most of the travel of the filter element 30 except for a small portion at the normal position thereof.

Any suitable reduction of the flow annulus between the lower ends of filter element 30 and housing 12 sufficient to effect viscous damping can be utilized, and it will be appreciated that the circumferential clearance depends upon the viscosity of the particular fluid being filtered. For example, in an oil filter having a filter housing ID of 4.82 inches and an OD at the lower end of the filter element of 4.39 inches, a step OD of 4.45 inches has been found satisfactory with oil having an SSU value of 150.

The preferred embodiment of the damper 50 herein comprises a circumferential ledge or step 52 integrally formed into the lower end of the filter housing 12. Those skilled in the art will appreciate the fact that one or more circumferential sleeves 54, each defining a circumferential step as shown in FIG. 3, attached to the internal lower end of the filter housing 12 would achieve the same effect, and such is considered fully equivalent to the preferred embodiment herein. Sleeve 54, for example, could be formed as a split or single-piece member and spot welded in place. In addition, while the invention has been illustrated and described in conjunction with an oil filter of the inside/out-type flow pattern, it will be understood that the integral viscous damper 50 of the invention can be adapted to virtually any type of filter, be it for liquid or gas filtration, having a movable filter element and a flow pattern of either inside/out or outside/in. It is recognized that the principle of the invention functions especially well with oil filters but the invention is not limited only to oil filters.

Fluid filter 10 as shown also includes a pair of tabs 56, which are best seen in FIG. 2, mounted on the bypass member 36 for movement therewith. Tabs 56 extend into closed chambers behind windows 58 formed in cover 26 to provide visual indication of the normal/bypass condition of the filter in a similar manner to the indicator tabs illustrated and described in U.S. Pat. Nos. 3,819,052 and 3,827,558 assigned to the assignee hereof. It will be understood that inclusion of indicator tabs 56 is optional and not critical to practice of the invention herein.

Fluid filter 10 as shown also includes a cupped washer 60 welded to the outside bottom end of filter housing 12 and a flat washer 62 welded thereover. If desired, either or both washers 60 and 62 can be added to the filter housing 12 for reinforcement to increase the pressure capacity of filter 10, but inclusion of these washers is optional and not critical to practice of the invention herein.

Referring now to FIG. 4, there is shown a fluid filter 70 of another type with which the integral viscous damper 50', whether in the form of a circumferential ledge or step 52' as shown therein or in the form of a circumferential sleeve 54 as shown in FIG. 3, can be utilized. Filter 70 incorporates numerous components which are substantially identical in construction and operation to corresponding components of filter 10 shown in FIGS. 1-3. These similar components have been designated in FIG. 4 with the same reference numerals utilized in the description of filter 10, but have been differentiated therefrom with a prime (') notation.

The primary distinction between filter 70 and filter 10 involves the fact that the fluid outlet(s) 72 of filter 70 are located in the housing 12' instead of the cover 26' so that filter 70 can be mounted in partial submersion in a fluid reservoir 74. In particular, four or any suitable number of fluid outlets 72 can be provided circumferentially spaced intervals around the lower portion of filter housing 12' above damper 50'. The flow pattern through element 30' of filter 70 is still of the inside/out direction, however, fluid leaves the filter through a plurality of outlets 72 in housing 12' instead of through a single outlet in the cover 26'. The cover 26' may include an outlet similar to outlet 46 of cover 26 shown in FIG. 1, in which outlet a plug or pressure sensor 76 can be mounted as desired. A flange 78 may also be provided such as by welding on filter housing 12' to facilitate mounting the filter 70 in reservoir 74. As shown, a gasket 80 is provided beneath flange 78 and bolts or other suitable fasteners 82 are utilized to secure filter 70 in place on the upper wall of reservoir 74 such that housing 12' extends into the reservoir with outlets 72 being positioned below the surface 84 of the fluid therein. In all other respects, filter 70 and the integral viscous damper 50' function substantially the same as hereinbefore described in connection with filter 10.

From the foregoing, it will be understood that the present invention comprises an improved fluid filter having several advantages over the prior art. The fluid filter herein incorporates an integral viscous damper to eliminate oscillation of the movable filter element. The integral damper herein is not complex in construction and can readily be adapted to a variety of fluid filters. Other advantages will be evident to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, modifications, and rearrangements and/or substitutions of elements falling within the scope of the invention as defined by the following Claims.

We claim:

1. In a fluid filter of the type including a housing, a cover secured to the housing, a filter element guided within the housing for movement between normal and bypass positions, and means for biasing the filter element toward the normal position, the improvement comprising:

step-like restriction means formed in a predetermined location on said housing adjacent the bypass position of said filter element for defining with an end of said filter element and the fluid within the filter a viscous damper to damp oscillation of said filter element between the normal and bypass positions, said step-like restriction being of substantially uniform inside diameter and defining a predetermined annulus with said filter element.

2. In a fluid filter of the type including a housing, a cover secured to the housing, a filter element guided within the housing for movement between normal and bypass positions, and means for biasing the filter element toward the normal position, the improvement comprising:

means on said housing adjacent the bypass position of said filter element for defining with an end of said filter element and the fluid within the filter a viscous damper to damp oscillation of said filter element between the normal and bypass positions;

said viscous damper means comprising a circumferential inner step integrally formed on said housing and extending along a predetermined portion of the path of travel of said filter element, said step being of substantially uniform inside diameter and defining a predetermined annulus with said filter element.

3. In a fluid filter of the type including a housing, a cover secured to the housing, a filter element guided within the housing for movement between normal and bypass positions, and means for biasing the filter element toward the normal position, the improvement comprising:

means on said housing adjacent the bypass position of said filter element for defining with an end of said filter element and the fluid within the filter a viscous damper to damp oscillation of said filter element between the normal and bypass positions;

said viscous damper means comprising an inner sleeve attached to said housing and extending along a predetermined portion of the path of travel of said filter element, said step being of substantially uniform inside diameter and defining a predetermined annulus with said filter element.

4. A fluid filter, comprising:

a generally cylindrical housing having an open end and a closed end;

a cover mounted on the open end of said housing;

a filter element disposed within said housing and guided for movement between normal and bypass positions;

means for yieldably biasing said filter element toward the normal position;

inlet and outlet means for directing fluid through said housing and through said filter element when said filter element is in the normal position; and step-like restriction means for defining with an end of said filter element and fluid within the filter a viscous damper in a predetermined location on the closed end of said housing adjacent the bypass position of said filter element to damp oscillation of said filter element between the normal and bypass positions, said step-like restriction being of substantially uniform inside diameter and defining a predetermined annulus with said filter element.

5. The fluid filter of claim 4, further including:
means for removably securing said cover to the open end of said housing.

6. The fluid filter of claim 5, wherein said means for removably securing said cover to said housing comprises a rod extending axially through said housing and having a threaded end screwed to said cover.

7. The fluid filter according to claim 6, wherein said filter element is substantially cylindrical and is guided along said rod for axial movement relative to said cover.

8. The fluid filter of claim 4, wherein said means for yieldably biasing said filter element comprises a spring positioned between said filter element and housing.

9. The fluid filter of claim 4, wherein said inlet and outlet means is located on said cover, including an inlet which terminates inwardly of said filter element and an outlet which terminates between said filter element and housing.

10. The fluid filter of claim 4, wherein said inlet and outlet means includes an inlet on said cover which terminates inwardly of said filter element and an outlet on said housing, the outlet being located between said cover and said viscous damper means.

11. A fluid filter, comprising:
a generally cylindrical housing having an open end and a closed end;
a cover mounted on the open end of said housing;
a filter element disposed within said housing and guided for movement between normal and bypass positions;
means for yieldably biasing said filter element toward the normal position;
inlet and outlet means for directing fluid through the filter and through said filter element when said filter element is in the normal position; and
means for defining a viscous damper on the closed end of said housing adjacent the bypass position of said filter element to damp oscillation of said filter element between the normal and bypass positions;
said viscous damper means comprising a circumferential step integrally formed on the inside of said housing and extending along a predetermined portion of the path of travel of said filter element, said step defining a predetermined annulus with said filter element to effect viscous damping in conjunction with fluid in the filter.

12. A fluid filter, comprising:
a generally cylindrical housing having an open end and a closed end;
a cover mounted on the open end of said housing;
a filter element disposed within said housing and guided for movement between normal and bypass positions;

means for yieldably biasing said filter element toward the normal position;
inlet and outlet means for directing fluid through the filter and through said filter element when said filter element is in the normal position; and
means for defining a viscous damper on the closed end of said housing adjacent the bypass position of said filter element to damp oscillation of said filter element between the normal and bypass positions;
said viscous damper means comprising a cylindrical sleeve attached to the inside of said housing and extending along a predetermined portion of the path of travel of said filter element, said step defining a predetermined annulus with said filter element to effect viscous damping in conjunction with fluid in the filter.

13. A fluid filter, which comprises:
a generally cylindrical housing having an open end and closed end;
cover means for closing the open end of said housing;
means for removably securing said cover to the open end of said housing;
a generally cylindrical filter element disposed within said housing and guided for movement between normal and bypass positions relative to said cover means, said filter element having upper and lower ends;
said cover including an inlet and outlet terminating within said housing on opposite sides of said filter element for conveying fluid therethrough;
means for yieldably biasing said filter element toward the normal position; and
step-like restriction means formed in a predetermined location on said housing and adapted to cooperate with the lower end of said filter element and fluid within said housing for defining a viscous damper to damp oscillation of said filter element between the normal and bypass positions, said step-like restriction being of substantially uniform inside diameter and defining a predetermined annulus with said filter element.

14. The fluid filter of claim 13, wherein said means for yieldably biasing said filter element comprises a coil spring surrounding said rod and positioned between said filter element and housing.

15. The fluid filter of claim 13, wherein said means for removably securing said cover to the open end of said housing comprises:
a rod extending axially through said housing; and
means for threadedly securing said rod to said cover.

16. A fluid filter, which comprises:
a generally cylindrical housing having an open end and closed end;
cover means for closing the open end of said housing;
means for removably securing said cover to the open end of said housing;
a generally cylindrical filter element disposed within said housing and guided for movement between normal and bypass positions relative to said cover means, said filter element having upper and lower ends;
said cover including an inlet and outlet terminating within said housing on opposite sides of said filter element for conveying fluid therethrough;
means for yieldably biasing said filter element toward the normal position; and
means on said housing adapted to cooperate with the lower end of said filter element and fluid within said housing for defining a viscous damper to damp oscillation of said filter element between the normal and bypass positions;

said viscous damper means comprising a circumferential step integrally formed on the inside of said housing and extending along a predetermined portion of the path of travel of said filter element, said step defining a predetermined annulus with said filter element to effect viscous damping in conjunction with fluid in the filter.

17. A fluid filter, which comprises:
a generally cylindrical housing having an open end and closed end;
cover means for closing the open end of said housing;
means for removably securing said cover to the open end of said housing;
a generally cylindrical filter element disposed within said housing and guided for movement between normal and bypass positions relative to said cover means, said filter element having upper and lower ends;
said cover including an inlet and outlet terminating within said housing on opposite sides of said filter element for conveying fluid therethrough;
means for yieldably biasing said filter element toward the normal position; and
means on said housing adapted to cooperate with the lower end of said filter element and fluid within said housing for defining a viscous damper to damp oscillation of said filter element between the normal and bypass positions;
said viscous damper means comprising a cylindrical sleeve attached to the inside of said housing and extending along a predetermined portion of the path of travel of said filter element, said step defining a predetermined annulus with said filter element to effect viscous damping in conjunction with fluid in the filter.

18. A fluid filter, which comprises:
a generally cylindrical housing having an open end and closed end;
cover means for closing the end of said housing;
means for removably securing said cover to the open end of said housing;
a generally cylindrical filter element disposed within said housing and guided for movement between normal and bypass positions relative to said cover means, said filter element having upper and lower ends;
said cover including a fluid inlet terminating within said housing inwardly of said filter element;
means for yieldably biasing said filter element toward the normal position; and
step-like restriction means formed in a predetermined location on said housing and adapted to cooperate with the lower end of said filter element and fluid within said housing for defining a viscous damper to damp oscillation of said filter element between the normal and bypass positions, said step-like restriction being of substantially uniform inside diameter and defining a predetermined annulus with said filter element;
said housing including at least one fluid outlet located between said cover and said viscous damper means.

19. The fluid filter of claim 18, wherein said means for yieldably biasing said filter element comprises a coil spring surrounding said rod and positioned between said filter element and housing.

20. The fluid filter of claim 18, wherein said means for removably securing said cover to the open end of said housing comprises:
a rod extending axially through said housing; and
means for threadedly securing said rod to said cover.

21. A fluid filter, which comprises:
a generally cylindrical housing having an open end and closed end;
cover means for closing the end of said housing;
means for removably securing said cover to the open end of said housing;
a generally cylindrical filter element disposed within said housing and guided for movement between normal and bypass positions relative to said cover means, said filter element having upper and lower ends;
said cover including a fluid inlet terminating within said housing inwardly of said filter element;
means for yieldably biasing said filter element toward the normal position; and
means on said housing adapted to cooperate with the lower end of said filter element and fluid within said housing for defining a viscous damper to damp oscillation of said filter element between the normal and bypass positions;
said housing including at least one fluid outlet located between said cover and said viscous damper means;
said viscous damper means comprising a circumferential step integrally formed on the inside of said housing and extending along a predetermined portion of the path of travel of said filter element, said step defining a predetermined annulus with said filter element to effect viscous damping in conjunction with fluid in the filter.

22. A fluid filter, which comprises:
a generally cylindrical housing having an open end and closed end;
cover means for closing the end of said housing;
means for removably securing said cover to the open end of said housing;
a generally cylindrical filter element disposed within said housing and guided for movement between normal and bypass positions relative to said cover means, said filter element having upper and lower ends;
said cover including a fluid inlet terminating within said housing inwardly of said filter element;
means for yieldably biasing said filter element toward the normal position; and
means on said housing adapted to cooperate with the lower end of said filter element and fluid within said housing for defining a viscous damper to damp oscillation of said filter element between the normal and bypass positions;
said housing including at least one fluid outlet located between said cover and said viscous damper means;
said viscous damper means comprising a cylindrical sleeve attached to the inside of said housing and extending along a predetermined portion of the path of travel of said filter element, said step defining a predetermined annulus with said filter element to effect viscous damping in conjunction with fluid in the filter.

* * * * *